US012748631B2

(12) United States Patent
Kandasamy et al.

(10) Patent No.: US 12,748,631 B2
(45) Date of Patent: Sep. 29, 2026

(54) REFERENCE IMPLEMENTATION OF CLOUD COMPUTING RESOURCES

(71) Applicant: INTERNATIONAL BUSINESS MACHINES CORPORATION, Armonk, NY (US)

(72) Inventors: Malarvizhi Kandasamy, OMBR Layout (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 17/814,348

(22) Filed: Jul. 22, 2022

(65) Prior Publication Data

US 2024/0028408 A1 Jan. 25, 2024

(51) Int. Cl.
*G06F 9/50* (2006.01)

(52) U.S. Cl.
CPC ............ *G06F 9/505* (2013.01); *G06F 9/5072* (2013.01)

(58) Field of Classification Search
CPC ............................... G06F 9/505; G06F 9/5072
See application file for complete search history.

(56) References Cited

U.S. PATENT DOCUMENTS 9,612,815 B1 4/2017 Jagtap
11,176,183 B2 * 11/2021 Puttoju .............. G05B 19/0426
2009/0171708 A1 * 7/2009 Bobak .................... G06Q 10/06 705/348
2010/0175044 A1 * 7/2010 Doddavula ............... G06F 8/36 717/104
2013/0185594 A1 * 7/2013 Budnik ............... G06F 11/3668 714/38.1

(Continued)

FOREIGN PATENT DOCUMENTS

EP 3465401 B1 1/2021

OTHER PUBLICATIONS

Derras et al. Reference Architecture Design: A Practical Approach. [online] SCITEPRESS., pp. 599-606. Retrieved From the Internet. (Year: 2018).*

(Continued)

*Primary Examiner* — April Y Blair
(74) *Attorney, Agent, or Firm* — Eric W. Chesley

(57) ABSTRACT

Described are techniques for reference implementation of cloud computing resources. The techniques include receiving specifications for a computing resource flow to implement a computing solution in a cloud computing environment. The computing resource flow comprises a set of computing resources and computing resource relationships that implement the computing solution. The techniques further include identifying a reference architecture that corresponds to at least a part of the computing resource flow for the computing solution and obtaining a reference template for the reference architecture from a reference code repository. The techniques further include generating a solution template that is based in part on the reference template, and the solution template provisions the computing resource flow in the cloud computing environment to implement the computing solution.

19 Claims, 8 Drawing Sheets

(56) References Cited

U.S. PATENT DOCUMENTS

| | | | | |
|---|---|---|---|---|
| 2014/0146055 | A1* | 5/2014 | Bala | G06F 8/63 345/501 |
| 2015/0319177 | A1 | 11/2015 | Lietz | |
| 2016/0140500 | A1 | 5/2016 | Rallapalli | |
| 2018/0232598 | A1* | 8/2018 | Vann | G06F 40/205 |
| 2020/0175395 | A1 | 6/2020 | Kathiresan | |
| 2020/0382438 | A1* | 12/2020 | Bregman | H04L 43/08 |
| 2023/0224257 | A1* | 7/2023 | Deviprasad | H04L 47/828 709/226 |

OTHER PUBLICATIONS

"XML to JSON Converter", Free Online XML to JSON Converter—FreeFormatter.com, Accessed Jun. 24, 2022, 2 pgs, <https://www.freeformatter.com/XML-to-json-converter.html>.

IBM, "Cloud Internet Services (CIS)", Use Virtual Servers to build highly available and scalable web app/ IBM Cloud Docs, Access Jun. 24, 2022, 22 pgs.<https://cloud.ibm.com/docs/cis?topic=solution-tutorials-highly-available-and-scalable-web-application>.

IBM-Cloud/VPC-Tutorials, Accessed Jun. 24, 2022, 4 pgs, <https://github.com/IBM-Cloud/vpc-tutorials/tree/master/vpc-lamp>.

Inflate/Deflate, URL Encode/Decode, Accessed Jun. 24, 2022, 1 pg.

Mell et al., "The NIST Definition of Cloud Computing", National Institute of Standards and Technology, Special Publication 800-145, Sep. 2011, 7 pages.

Seibert;, "Extracting the XML Form MXFILES", draw.io, Aug. 3, 2016, 4 pgs, <https://drawio-app.com/extracting-the-XML-from-mxfiles/>.

* cited by examiner

REFERENCE IMPLEMENTATION OF CLOUD COMPUTING RESOURCES

BACKGROUND

The present disclosure relates to cloud computing, and, more specifically, to implementing a computing solution in a cloud computing environment. When implementing a cloud computing solution, a number of computing resources are created, including storage, network, virtual machines (VMs), etc. The creation of these computing resources is generally based on a user's solution requirements. A cloud architect analyzes the user's solution requirements and develops a code implementation that creates the various computing resources in a cloud computing environment.

SUMMARY

Aspects of the present disclosure are directed toward a computer-implemented method comprising receiving specifications for a computing resource flow to implement a computing solution in a cloud computing environment, where the computing resource flow comprises a set of computing resources and computing resource relationships that implement the computing solution. The method further comprises identifying a reference architecture that corresponds to at least a part of the computing resource flow for the computing solution and obtaining a reference template for the reference architecture from a reference code repository. The method further comprises generating a solution template that is based in part on the reference template, where the solution template provisions the computing resource flow in the cloud computing environment to implement the computing solution.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
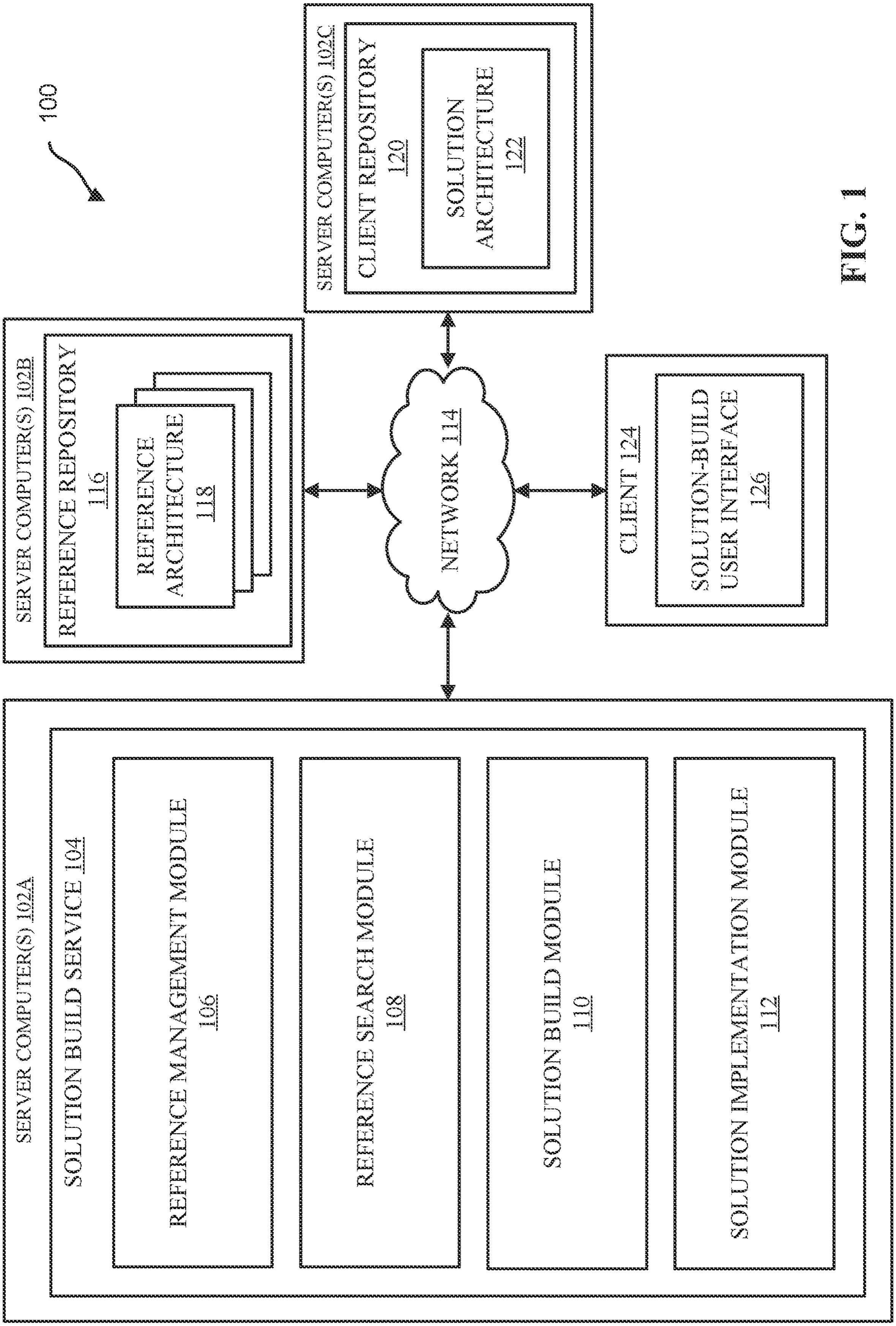
FIG. 1 is a block diagram illustrating an example computational environment implementing a solution build service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward implementing a computing solution in a cloud computing environment based in part on one or more reference architectures. While not limited to such applications, embodiments of the present disclosure may be better understood in light of the aforementioned context.

When implementing a computing solution in a cloud computing environment, there may be situations where an existing reference computing architecture can be used, at least in part, to implement the current computing solution. In these situations, computer code used to provision computing resources of the reference computing architecture can be reused and/or modified to implement the current computing solution. However, in the past, cloud architects have not had the ability to perform automated searches of existing reference architectures to identify a reference architecture that corresponds to the requirements of a current computing solution. Rather, a cloud architect has had to manually perform searches for cloud computing tutorials that correspond to their solution requirements. If a tutorial was found that meets the solution requirements, the cloud architect had to manually copy a reference template provided by the tutorial from a tutorial code repository to the cloud architect's code repository, such that the cloud architect could utilize the reference template to implement the cloud architect's computing solution.

Advantageously, aspects of the present disclosure overcome these challenges by automating the process of generating a solution template (e.g., a resource provisioning template) that is based, at least in part, on one or more reference architectures that correspond to the computing resource flow requirements of a computing solution. More specifically, aspects of the present disclosure can identify one or more existing reference architectures that have computing resource flows which correspond, at least in part, to the computing resource flow requirements of a computing solution. Aspects of the present disclosure can then generate a solution template that is based on the one or more reference architectures. The solution template, when processed, can provision computing resources in a cloud computing environment, such that the computing resources are configured according to the resource flow requirements of the computing solution.

As an example advantage, aspects of the present disclosure decrease a time to develop and deploy a new cloud computing infrastructure that implements a user's computing solution. Namely, because aspects of the present disclosure automate development of a solution template (e.g., searching for a reference architecture that corresponds to a user's requirements and generating a solution template based on the reference architecture), the time to create the solution template is decreased, and the time between defining the requirements of the computing solution and deploying the cloud computing infrastructure that implements the computing solution is decreased.

As another example advantage, aspects of the present disclosure improve the reliability of a cloud computing infrastructure provisioned for a computing solution because the cloud computing infrastructure can be based, at least in part, on an existing reference architecture that has been tested and found to be reliable. Namely, because the cloud computing infrastructure for a user's computing solution is based on a working reference architecture, the cloud computing infrastructure provisioned for the user's computing solution is less likely to experience failures associated with an untested solution template.

Referring now to the figures, FIG. 1 is a block diagram illustrating an example computational environment 100 implementing a solution build service 104, in accordance with some embodiments of the present disclosure. As referred to herein, a computing solution is an implementation of a cloud computing architecture or infrastructure comprising computing resources (e.g., virtual servers, virtual storage, virtual networks, virtual applications and operating systems, virtual clients, databases, analytics, etc.) configured to provide a particular service or set of services to an end user. The cloud computing architecture defines a computing resource flow that accomplishes the service or services delivered to the end user via a set of computing resources and the relationships between them (e.g., connections, function calls, procedure calls, queries, etc.). A more detailed discussion regarding cloud computing architectures and cloud computing environments is provided later in association with FIGS. 6-8.

As illustrated, the computational environment 100 can include a plurality of server computers 102A-C hosting aspects of a solution build service 104 that provides users with automation tools to implement computing solutions based at least in part on reference architectures 118. The solution build service 104 can include a reference management module 106, a reference search module 108, a solution build module 110, a solution implementation module 112, and other modules as can be appreciated.

The reference management module 106 can manage a reference repository 116 containing a collection of reference architectures 118. A reference architecture 118, as referred to herein, is an existing template for a cloud computing architecture or infrastructure that defines a computing resource flow to provide one or more services. The template for the reference architecture 118 can comprise a resource provisioning template, a cloud computing tutorial, and/or another type of code package containing scripts, modules, and dependencies for provisioning at least a portion of a cloud computing infrastructure. The reference architecture 118 can be stored in the reference repository 116 which is accessible to the solution build service 104. As such, the reference architecture 118 may not be currently provisioned in a cloud computing environment; however, the solution template for the reference architecture 118 can be stored in the reference repository 116 to make the reference architecture 118 available to the solution build service 104. Illustratively, reference architectures 118 can be curated from other code repositories (e.g., internal and external code repositories) that provide cloud computing tutorials, and the reference architectures 118 can be added to the reference repository 116.

The reference management module 106 can manage the reference architectures 118 stored in the reference repository 116 using a database (not shown). The reference management module 106 can receive requests to add reference architectures 118 to the reference repository 116 and catalog the reference architectures 118 in the database, as well as requests to replace or remove the reference architectures 118 in the reference repository 116 when the reference architectures 118 become obsolete or are no longer needed. In response to the requests, the reference management module 106 can perform the requested actions associated with the reference architectures 118.

The reference management module 106 can make reference architectures 118 stored in the reference repository 116 searchable (e.g., indexed, tagged, etc.), such that the reference repository 116 can be queried for reference architectures 118 that match, or at least partially match, the specifications of a computing solution. In some examples, a reference architecture 118 stored in the reference repository 116 can include a diagram as code and/or an architecture diagram that defines a computing resource flow of the reference architecture 118. A diagram as code comprises computer code that outlines or prototypes a cloud computing architecture including computing resources and the relationships between the computing resources. An architecture diagram visually documents computing resources in a cloud computing infrastructure and the relationships between the computing resources. The reference management module 106 can analyze the diagram as code and/or the architecture diagram to extract information for the computing resources and the computing resource relationships that comprise the computing resource flow, and the reference management module 106 can create a record in the database containing the information for the computing resource flow to enable the reference search module 108 to perform searches of the reference repository 116, as described below.

The reference search module 108 performs a search of the reference repository 116 to identify one or more reference architectures 118 that correspond to the specifications of a computing solution. The specifications of a computing solution define a computing resource flow which implements the computing solution in a cloud computing environment. The specifications can be provided to the reference search module 108 via a client 124, and in response, the reference search module 108 can perform a search of the reference repository 116 for one or more reference architectures 118 that correspond to the specifications.

In some embodiments, the specifications for the computing resource flow can comprise a diagram as code that defines the computing resource flow. As described above, a diagram as code comprises computer code that outlines or prototypes a cloud computing architecture including computing resources and the relationships between the computing resources. A user can submit the diagram as code to the reference search module 108 via a solution-build user interface 126 on the client 124, and the reference search module 108 can analyze the diagram as code and extract information for the computing resources and the computing resource relationships that comprise the computing resource flow.

Also, in some embodiments, the specifications for the computing resource flow can comprise an architecture diagram that defines the computing resource flow. As described above, an architecture diagram visually documents computing resources in a cloud computing infrastructure and the relationships between the computing resources. A user can submit the architecture diagram to the reference search module 108 via the solution-build user interface 126 on the client 124, and the reference search module 108 can analyze the architecture diagram and extract information for the computing resources and the computing resource relationships that comprise the computing resource flow.

The reference search module 108 can perform a search of the reference repository 116 using the specifications for a computing resource flow and, in response to identifying one or more reference architectures 118 that correspond to the computing resource flow, the reference search module 108 can provide search results for the reference architectures 118 to the solution-build user interface 126 on the client 124. A search performed by the reference search module 108 can search for a single reference architecture 118 that corresponds to a computing resource flow of a user's computing solution.

In cases where the user's computing solution falls as a superset to a single reference architecture 118 (e.g., the user's computing resource flow includes additional computing resources and relationship requirements that are not within the single reference architecture 118), then the reference search module 108 can search for a reference architecture 118 that corresponds to the additional requirements of the user's computing resource flow. For example, the reference search module 108 can identify a first reference architecture 118 that corresponds to a first portion of the user's computing resource flow, and then identify a second reference architecture 118 that corresponds to a second portion of the user's computing resource flow. Reference templates can be obtained for both the first and second reference architectures 118 to be used to implement the user's computing solution in a cloud computing environment. In some embodiments, the user can select/deselect individual reference architecture files located in the reference repository 116 (via the solution-build user interface 126) to include in a solution architecture 122 and the individual files can be copied to a client repository 120 associated with the client. As such, the user can select individual reference architecture files from the first and second reference architectures 118 that correspond to the user's computing resource flow.

In cases where the user's computing solution falls as a subset to a single reference architecture 118 (e.g., the single reference architecture 118 includes additional computing resources and relationships that are not within the user's computing solution requirements), then the user can remove (deselect) the computing resources and relationships that are outside of the user's computing solution requirements. For example, the user can deselect individual reference architecture files included in the reference architecture 118 (via the solution-build user interface 126) so that the deselected reference architecture files are not copied from the reference repository 116 to the client repository 120.

As indicated above, in some embodiments, the reference search module 108 can provide search results to a user to allow the user to select which reference architectures 118 to use to generate a solution template for the user's computing solution. For example, the reference search module 108 can generate a list of reference computing resources (e.g., virtual servers, virtual storage, virtual networks, virtual applications and operating systems, virtual clients, databases, analytics, etc.) included in a reference architecture 118. In cases where a reference architecture 118 is identified for a portion of a computing resource flow of a user's computing solution, the reference architecture 118 in the list can be demarcated to indicate which portion of the computing resource flow the reference architecture 118 is associated with. The reference search module 108 can provide the resource list for display in the solution-build user interface 126 on the client 124 to allow user-selection and user-deselection of the reference architectures 118 (e.g., reference architecture files) included in the resource list.

Also, in some embodiments, the reference search module 108 can calculate a match score for each reference architecture 118 identified as corresponding to the computing resource flow of a user's computing solution and provide the match score to the solution-build user interface 126 for display on the client 124. The match score for a reference architecture 118 can indicate a correlation between a reference resource flow of a reference architecture 118 and a computing resource flow of a user's computing solution. An example of a method used to generate the resource list and the match scores is described in greater detail later in association with FIG. 2.

The solution build module 110 obtains a reference template for a reference architecture 118 selected to implement a user's computing solution from the reference repository 116. In cases where more than one reference architecture 118 has been selected (e.g., for portions of a computing resource flow), the solution build module 110 can obtain reference templates for the reference architectures 118 (or relevant portions of reference templates corresponding to the portions of the computing resource flow) from the reference repository 116. A reference template for a reference architecture 118 can comprise a resource provisioning template, a cloud computing tutorial, and/or another code package containing scripts, modules, and dependencies for provisioning at least a part of a cloud computing infrastructure. Illustratively, a resource provisioning template can comprise a collection of files that, together, define the state of a cloud computing infrastructure to be provisioned. The files can include different configuration files such as variables, resources, and modules. The resource provisioning template can be a modular structure, such that it is set up in a file hierarchy, where each configuration file contains a name with an extension indicating a file format. A cloud computing tutorial can be instructions for implementing a particular cloud computing architecture that includes templates and/or other files containing computer code which provisions a cloud computing infrastructure.

The solution build module 110 uses a reference template obtained from the reference repository 116 to generate, at least in part, the solution architecture 122 for a user's computing solution. The solution architecture 122 generated for the user's computing solution includes a solution template that is based, at least in part, on the reference template obtained from the reference repository 116. In some embodiments, the solution build module 110 copies the reference architecture 118 into the client repository 120, and a user can modify the reference template of the reference architecture 118, via the solution-build user interface 126, to correspond to the specifications of the user's computing solution. In cases where multiple reference architectures 118 are identified for portions of a computing resource flow of a user's computing solution, the solution build module 110 can copy the reference architectures 118 and place the copies in the client repository 120 to allow a user to modify the reference template of the reference architectures 118 to correspond to the specifications of the user's computing solution.

In some embodiments, the solution build module 110 can evaluate a reference template of the reference architecture 118 and modify the reference template based on specifications for a user's computing solution to generate a solution template for the user's computing solution. For example, using a computing resource flow obtained from a diagram as code or architecture diagram for a user's computing solution, the solution build module 110 can make changes to the reference template (e.g., modify scripts, modules, configuration files, etc.) to correspond to the user's computing solution. As a non-limiting example, the solution build module 110 can modify a reference template of a reference architecture 118 to provision a number of worker nodes specified by an architecture diagram of a user's computing solution. As another non-limiting example, the solution build module 110 can modify a resource naming convention used by the reference architecture 118 to correspond to a user's computing solution. As yet another non-limiting example, the solution build module 110 can generate the solution architecture 122 based in part on reference templates obtained for portions of a user's computing solution, such that the solution build module 110, for example, combines a first reference architecture 118 (or portion thereof) with a second reference architecture 118 (or portion thereof), and standardizes references between the first and second reference architectures 118 to allow communication between the computing resources in the solution architecture 122. As will be appreciated, more than two reference architectures 118 corresponding to portions of a user's computing solution can be combined to generate the solution architecture 122.

After generating the solution architecture 122 for a user's computing solution, the solution build module 110 can store the solution architecture 122 to a client repository 120, thereby providing the solution architecture 122 to a user who can then access the solution architecture 122 (e.g., via the solution-build user interface 126 on the client 124) and implement the user's computing solution using the solution architecture 122. For example, the user can execute a solution template for the solution architecture 122 that provisions the computing resource flow of the user's computing solution in a cloud computing environment.

In some embodiments, after generating the solution architecture 122, the solution implementation module can automatically provision a computing resource flow for a user's computing solution in a cloud computing environment using the solution architecture 122. For example, after generating the solution architecture 122, the solution build module 110 can send an indication to the solution implementation module 112 that the solution architecture 122 is available in the client repository 120. In response, the solution implementation module 112 can execute a solution template for the solution architecture 122 to provision the computing resource flow of the user's computing solution in the cloud computing environment.

As shown in FIG. 1, a network 114 can be provided to enable communication between the components of the computational environment 100. The network 114 can include any useful computing network, including an intranet, the Internet, a local area network, a wide area network, a wireless data network, or any other such network or combination thereof. Components utilized for the network 114 may depend at least in part upon the type of network and/or environment selected. Communication over the network 114 may be enabled by wired or wireless connections and combinations thereof.

In some embodiments, the modules illustrated and discussed in FIG. 1 can be implemented as computing services. For example, a module can be considered a service with one or more processes executing on a server or other computer hardware. Such services can provide a service application that receives requests and provides output to other services or consumer devices. An application programming interface (API) can be provided for each module to enable a first module to send requests to and receive output from a second module. Such APIs can also allow third parties to interface with the module and make requests and receive output from the modules. While FIG. 1 illustrates an example of a system that can implement the techniques above, many other similar or different environments are possible. The example environments discussed and illustrated above are merely representative and not limiting.

Figure 2:
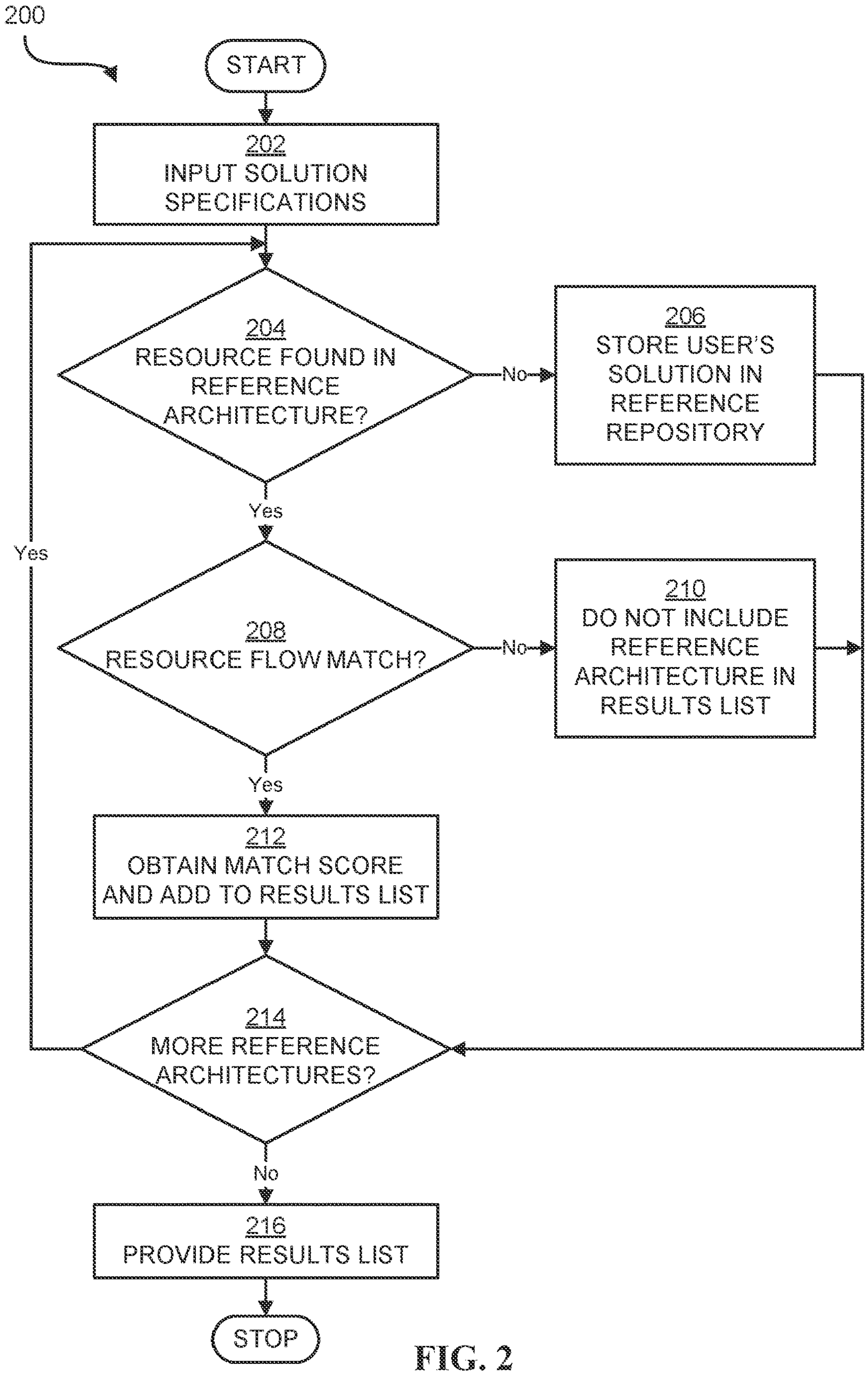
FIG. 2 is a flow diagram that illustrates an example method for identifying reference architectures that correspond to a computing resource flow of a computing solution, in accordance with some embodiments of the present disclosure.

FIG. 2 is a flow diagram illustrating an example method 200 for identifying reference architectures that correspond to a computing resource flow for a user's computing solution, in accordance with some embodiments of the present disclosure. A reference architecture identified by the method 200 can be used, at least in part, to implement the computing solution using computing resources provisioned in a cloud computing environment.

Starting with operation 202, the method 200 receives input of specifications for the user's computing solution. The specifications of the user's computing solution include requirements for a computing resource flow, which defines one or more services delivered to an end user via a set of computing resources (e.g., virtual servers, virtual storage, virtual networks, virtual applications and operating systems, virtual clients, databases, analytics, etc.) and the relationships (e.g., connections, function calls, procedure calls, queries, etc.) between the computing resources.

In some embodiments, the specifications for the user's computing solution can include a diagram as code that defines the computing resource flow. The diagram as code comprises computer code that outlines or prototypes a cloud computing architecture including the computing resources and the relationships between the computing resources. The method 200 can analyze the diagram as code (e.g., parse the code) and extract information for the computing resources and the computing resource relationships that comprise the computing resource flow from the diagram as code.

In some embodiments, the specifications for the user's computing solution can include an architecture diagram that defines the computing resource flow. The architecture diagram visually documents computing resources in a cloud computing infrastructure and the relationships between the computing resources. For example, the architecture diagram can contain tags that provide resource details, such as resource type, resource identifier, resource connections, and the like. The method 200 can analyze the architecture diagram and extract information for the computing resources and the computing resource relationships that comprise the computing resource flow. For example, computing resource details can be extracted from the tags contained in the architecture diagram to identify the computing resources and relationships included in the computing resource flow. As an illustration, the architecture diagram can be exported to an XML (extensible markup language) file and then converted to a JSON (JavaScript object notation) file, from which a resource graph can be constructed, which provides a list of computing resources and relations between the computing resources.

Operation 204 determines whether a computing resource in the computing resource flow is found in a reference architecture. For example, the operation 204 searches one or more reference repositories to identify a reference architecture that includes at least one of the computing resources (e.g., a virtual server, virtual storage, etc.) included in the computing resource flow of the user's computing solution.

In the case that operation 204 is unsuccessful in identifying a reference architecture that includes the computing resource, then operation 206 stores the user's computing solution in a reference repository to allow future reference of the user's computing solution. For example, even though the method 200 was not able to identify a reference architecture that matches the computing resource flow of the user's computing solution, other users may benefit from the user's computing solution by making it available in the reference repository.

In the case that operation 204 is successful in identifying a reference architecture that includes the computing resource, then operation 208 determines whether the reference architecture contains a computing resource flow that, at least partially, matches the computing resource flow of the user's computing solution. For example, the computing resource flow for a user's computing solution can contain multiple computing resource relationships, and these individual relationships can be categorized into flow levels used to identify a matching reference architecture.

As an illustrative example, using the specifications for the user's computing solution, a computing resource flow and resource list can be determined. As an example, the computing resource flow may comprise:

"User("user")>>>LoadBalancer("web_LB")>>>web_group1>>BlockStorage("FS1") web_group1>>LoadBalancer("db_LB")>>db_group1>>BlockStorage("FS2")".

The resource list may comprise:

"[LoadBalancer, Cluster[Virtual Server, Virtual Server] FileStorage, LoadBalancer, Cluster[DB Server, DB Server], FileStorage]".

After determining the computing resource flow and resource list, the computing resource relationships can be categorized into flow levels. As an example:

| From | To | Level |
|---|---|---|
| LoadBalancer | Cluster[Web Virtual Server] | 1 |
| Cluster[Web Virtual Server] | FileStorage | 2 |
| Cluster[Web Virtual Server] | LoadBalancer | 2 |
| LoadBalancer | Cluster[DB Virtual Server] | 3 |
| Cluster[DB Virtual Server] | FileStorage | 4 |

The level in the table above denotes the flow level of a computing resource relationship. Also, as shown in the table above, computing resource can have more than one computing resource relationship, and these computing resource relationships can be categorized into the same flow level.

Operation 208 searches one or more reference repositories to identify a reference architecture that corresponds to a flow level of the user's computing solution. In the case that a reference architecture does not correspond to a flow level of the user's computing solution, then operation 210 passes over (skips) the reference architecture, such that the reference architecture is not included in a results list of candidate reference architectures. If a reference architecture does correspond to a flow level of the user's computing solution, then operation 208 determines how many of the flow levels are included in the reference architecture. Operation 212 then obtains a match score for the reference architecture and adds the reference architecture to the results list of candidate reference architectures.

The match score obtained by operation 212 indicates a correlation between a reference resource flow of the reference architecture and the computing resource flow for the user's computing solution. The match score can be calculated based on a number of flow levels the reference architecture matches. As a non-limiting example, the match score can be calculated using the formula (Matching Flow Levels/Total Flow Levels*100). Illustratively, the match score can be a percentage value that falls within a range of values, wherein each range of values can be categorized as one of: a strong match (e.g., 90-100%), a good match (e.g., 75-89%), a moderate match (e.g., 50-74%), a low match (e.g., 25-49%), or a poor match (0-24%). As will be appreciated, the match score can be provided using any appropriate scoring technique and is not limited to the example above.

Operation 214 determines whether to search for additional reference architectures. For example, if a reference architecture having a strong match score has been identified, operation 214 can stop searching for additional reference architectures. However, if a reference architecture has a match score that falls somewhere below a strong or good match, operation 214 may continue searching to find a reference architecture with a strong or good match, or find one or more additional reference architectures that match a portion of the computing resource flow for the user's computing solution, such that relevant portions of the reference architectures can be used to implement corresponding portions of the user's computing solution. In the case operation 214 determines to stop searching reference architectures, then operation 216 provides the results list to allow implementation of the user's computing solution using the reference architectures.

Figure 3:
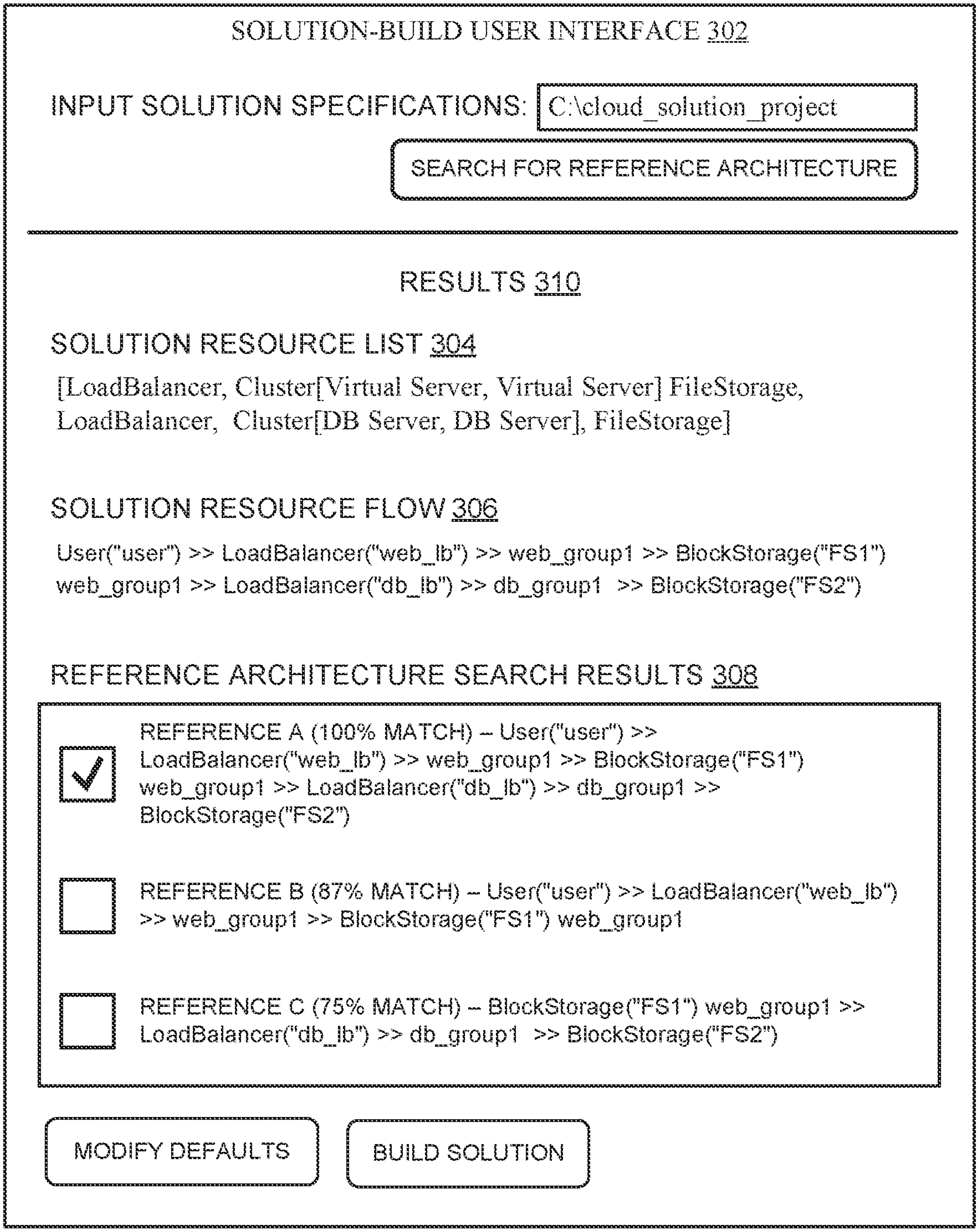
FIG. 3 is a diagram illustrating an example user interface for a solution build service, in accordance with some embodiments of the present disclosure.

FIG. 3 illustrates an example of a solution-build user interface 302 for a solution build service, in accordance with some embodiments of the present disclosure. The solution-build user interface 302 can be provided to a client device (e.g., via a browser application) to allow a user to access the solution build service 104, described earlier in association with FIG. 1, and implement a computing solution based at least in part on a reference architecture.

The solution-build user interface 302 can receive input of a user's specifications for a computing solution and provide the specifications to the solution build service 104 along with a request to search for a reference architecture (e.g., via an API). For example, a user can input a file path for a diagram as code or an architecture diagram to the solution-build user interface 302, and the solution-build user interface 302 can send the file path to the solution build service 104 with a search request for a reference architecture.

In response to receiving the search request, the solution build service 104 can retrieve the specifications (e.g., diagram as code or architecture diagram) from a location specified by the file path and perform the method 200 described earlier in association with FIG. 2. For example, the solution build service 104 can analyze the specifications to extract information for a computing resource flow, which can include a list of computing resources and relationships between the computing resources, and the solution build service 104 can then perform a search for reference architectures that correspond to the computing resource flow.

The solution build service 104 can return results 310 of the analysis and search to the solution-build user interface 302 for display. The results 310 displayed in the solution-build user interface 302 can include a solution resource list 304, a solution resource flow 306, and reference architecture search results 308. The reference architecture search results 308 can include one or more reference architectures that have resource flows that match or partially match the computing resource flow of the user's computing solution. As illustrated, each reference architecture displayed in the search results 308 can include a match score that indicates a correlation between a reference resource flow and the computing resource flow for the user's computing solution. Also, each reference architecture displayed in the search results 308 can include the computing resource flow, or portion thereof, that corresponds to the computing resource flow of the user's computing solution.

The user can review the reference architecture search results 308 and select one or more reference architectures that best meet the user's specifications. In some embodiments, the solution-build user interface 302 can allow a user to modify a selected reference architecture to correspond to the user' computing solution. For example, a user can make changes to a reference architecture, such as modifying scripts, modules, configuration files, etc. to correspond to the user's computing solution. As a non-limiting example, the user can modify the reference architecture to provision a number of worker nodes specified by an architecture diagram for the user's computing solution. As another non-limiting example, the user can modify a reference architecture to use a resource naming convention of the user's computing solution.

After selecting a reference architecture, the user can send a build request via the solution-build user interface 302 to the solution build service 104. In response, the solution build service 104 can generate a solution template that is based in part on the reference architecture, and the solution template can be executed to implement the user's computing solution in a cloud computing environment.

Figure 4:
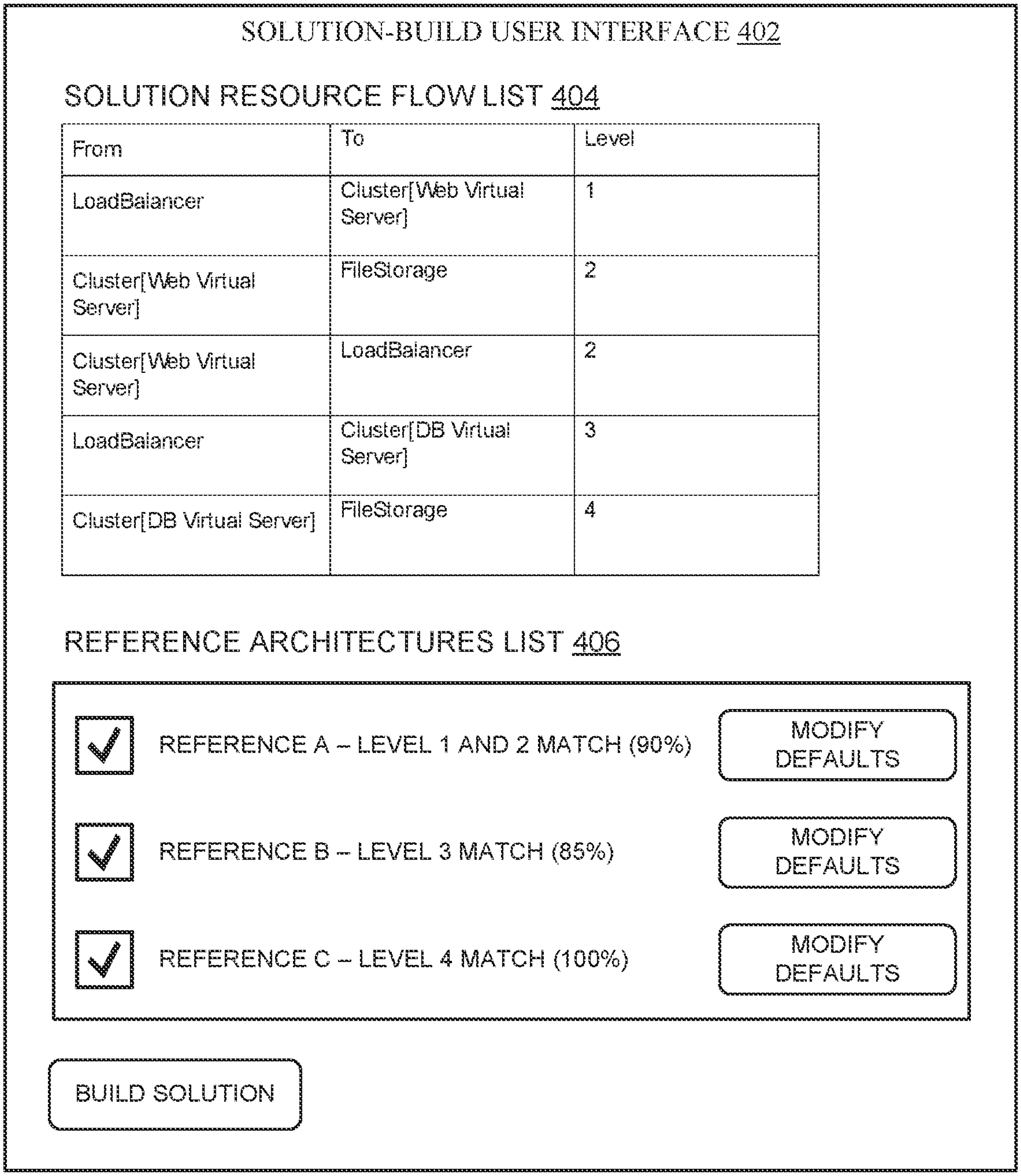
FIG. 4 is a diagram illustrating another example user interface for a solution build service, in accordance with some embodiments of the present disclosure.

FIG. 4 illustrates another example of a solution-build user interface 402 for a solution build service, in accordance with some embodiments of the present disclosure. As described earlier, in cases where the solution build service 104 is unable to identify a single reference architecture that matches a computing resource flow of a user's computing solution, the solution build service 104 can search for a reference architecture that corresponds to a portion of a computing resource flow of the user's computing solution. For example, the computing resource relationships of the computing resource flow can be categorized into flow levels, and the solution build service 104 can identify a reference architecture for each flow level in the computing resource flow.

The solution-build user interface 402 can display a solution resource flow list 404 that shows each flow level in a computing resource flow. The solution-build user interface 402 can also display a list of reference architectures 406 that correspond to the flow levels in the computing resource flow. A user can select the reference architectures to use to implement the user's computing solution, as well as modify default values of the reference architecture to correspond to the specifications of the user's computing solution. For example, the user can standardize references between the reference architectures to allow communication between the computing resources defined in the reference architectures.

After selecting the reference architectures, the user can send a build request via the solution-build user interface 402 to the solution build service 104, which in response, generates a solution template that is based on the reference architectures. For example, the solution build service 104 can implement the user's computing solution using reference templates for the reference architectures, such that the relevant portions of the reference architectures are combined to implement the user's computing solution. Although FIGS. 3 and 4 illustrate a solution-build user interface as a graphical user interface, it will be appreciated that the solution-build user interface can be a command line interface, a menu-driven user interface, or any other appropriate user interface.

Figure 5:
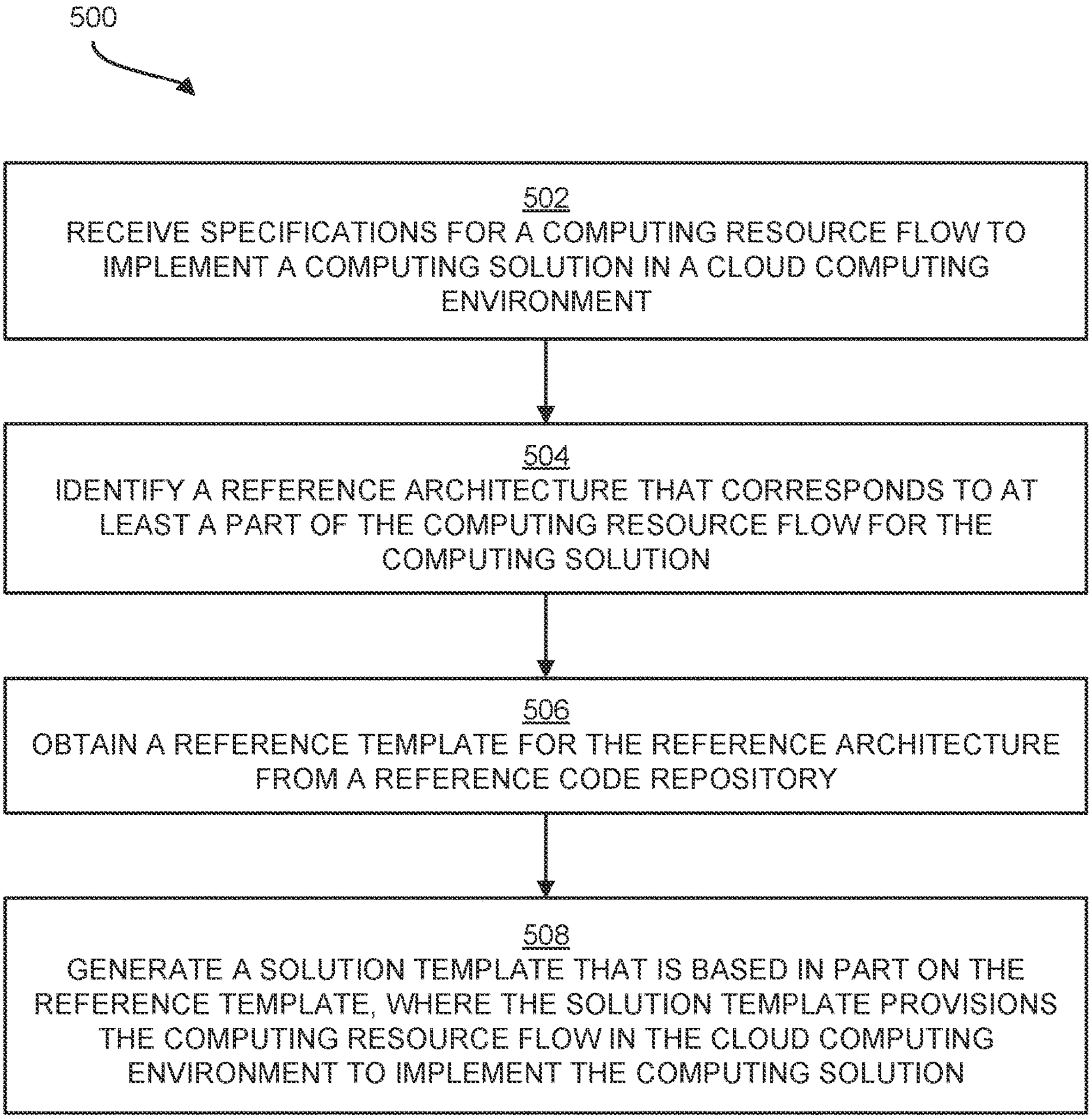
FIG. 5 is a flow diagram illustrating an example method for implementing a computing solution in a cloud computing environment based at least in part on a reference architecture, in accordance with some embodiments of the present disclosure.

FIG. 5 is a flow diagram illustrating an example method 500 for implementing a computing solution in a cloud computing environment based at least in part on a reference architecture, in accordance with some embodiments of the present disclosure.

Operation 502 receives specifications for a computing resource flow to implement a computing solution in a cloud computing environment, wherein the computing resource flow comprises a set of computing resources and computing resource relationships that implement the computing solution. In some embodiments receiving the specifications for the computing resource flow includes receiving a diagram as code that defines the computing resource flow for the computing solution and analyzing the diagram as code to extract information for the computing resources and the computing resource relationships. In some embodiments, receiving the specifications for the computing resource flow includes receiving an architecture diagram that defines the computing resource flow for the computing solution and analyzing the architecture diagram to extract information for the computing resources and the computing resource relationships.

Operation 504 identifies a reference architecture that corresponds to at least a part of the computing resource flow for the computing solution. For example, the computing resource flow can be compared with one or more reference architectures to determine whether the reference architectures include reference computing resource flows that correspond to the computing resource flow for the computing solution.

In some embodiments, identifying the reference architecture can include determining that the reference architecture includes at least one computing resource that corresponds to the computing resource flow for the computing solution, determining that the reference architecture includes a reference resource flow that corresponds to at least a portion of the computing resource flow for the computing solution, and calculating a match score for the reference architecture indicating a correlation between the reference resource flow and the computing resource flow for the computing solution.

In some embodiments, identifying the reference architecture can include determining that a first reference architecture corresponds to a first portion of the computing resource flow for the computing solution and identifying a second reference architecture that corresponds to a second portion of the computing resource flow for the computing solution. The reference template can be obtained in association with the first reference architecture and the second reference architecture.

Operation 506 obtains a reference template for the reference architecture from a reference code repository. In some embodiments, obtaining the reference template for the reference architecture can include generating a resource list of reference computing resources included in the reference architecture and providing the resource list for display in a user interface to allow user-selection and user-deselection of the reference computing resources included in the resource list. The solution template can be generated to provision the reference computing resources selected by the user from the resource list.

Operation 508 generates a solution template that is based in part on the reference template, wherein the solution template provisions the computing resource flow to implement the computing solution in the cloud computing environment. In some embodiments, the solution template can comprise a resource provisioning template that, when executed, creates the computing resources and the computing resource relationships in the cloud computing environment to implement the computing solution.

Figure 6:
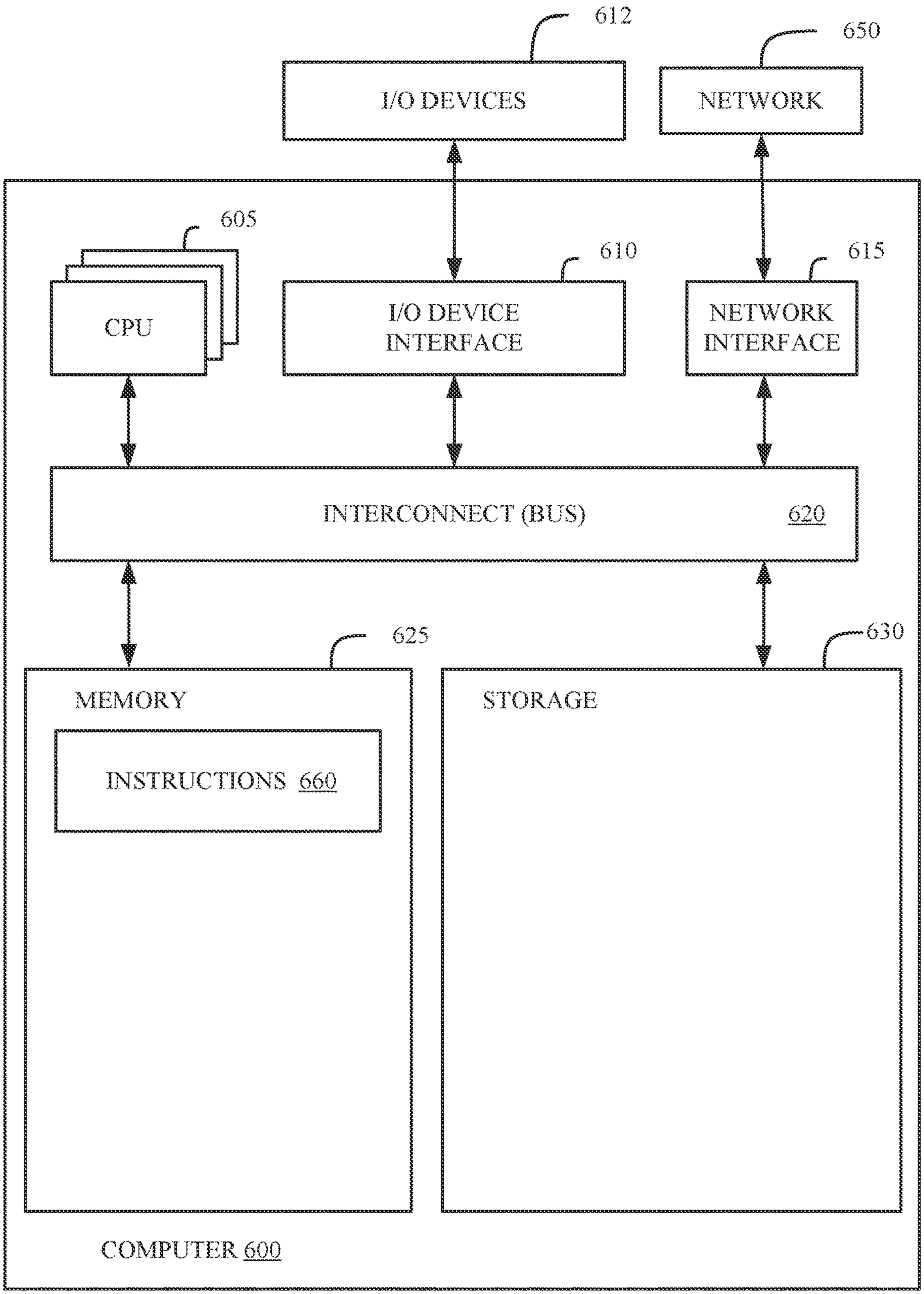
FIG. 6 is a block diagram of illustrating an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods earlier and/or implement the functionality discussed earlier. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., the solution build service 104 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods described earlier and/or implement the functionality discussed earlier. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
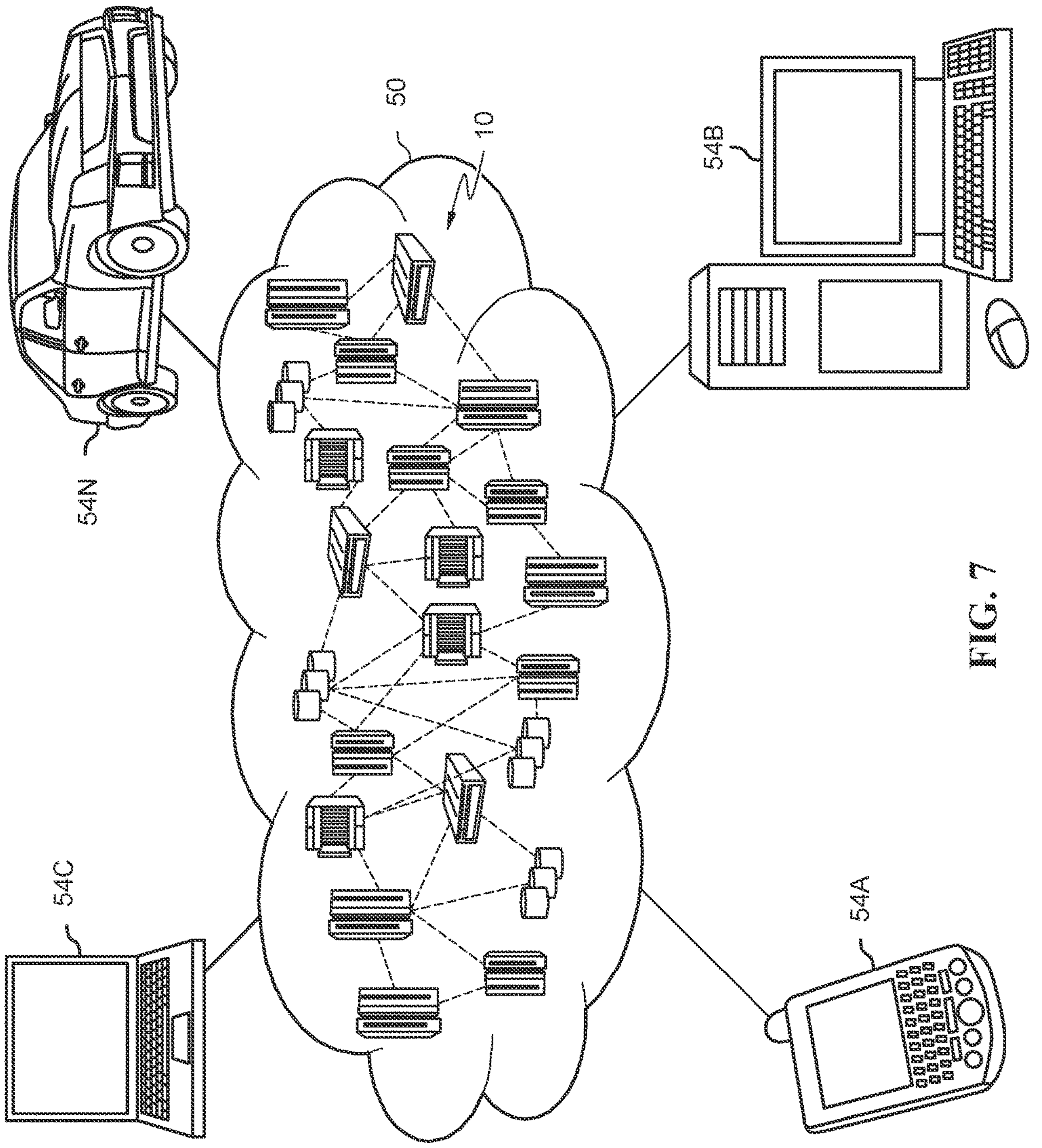
FIG. 7 depicts an example cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
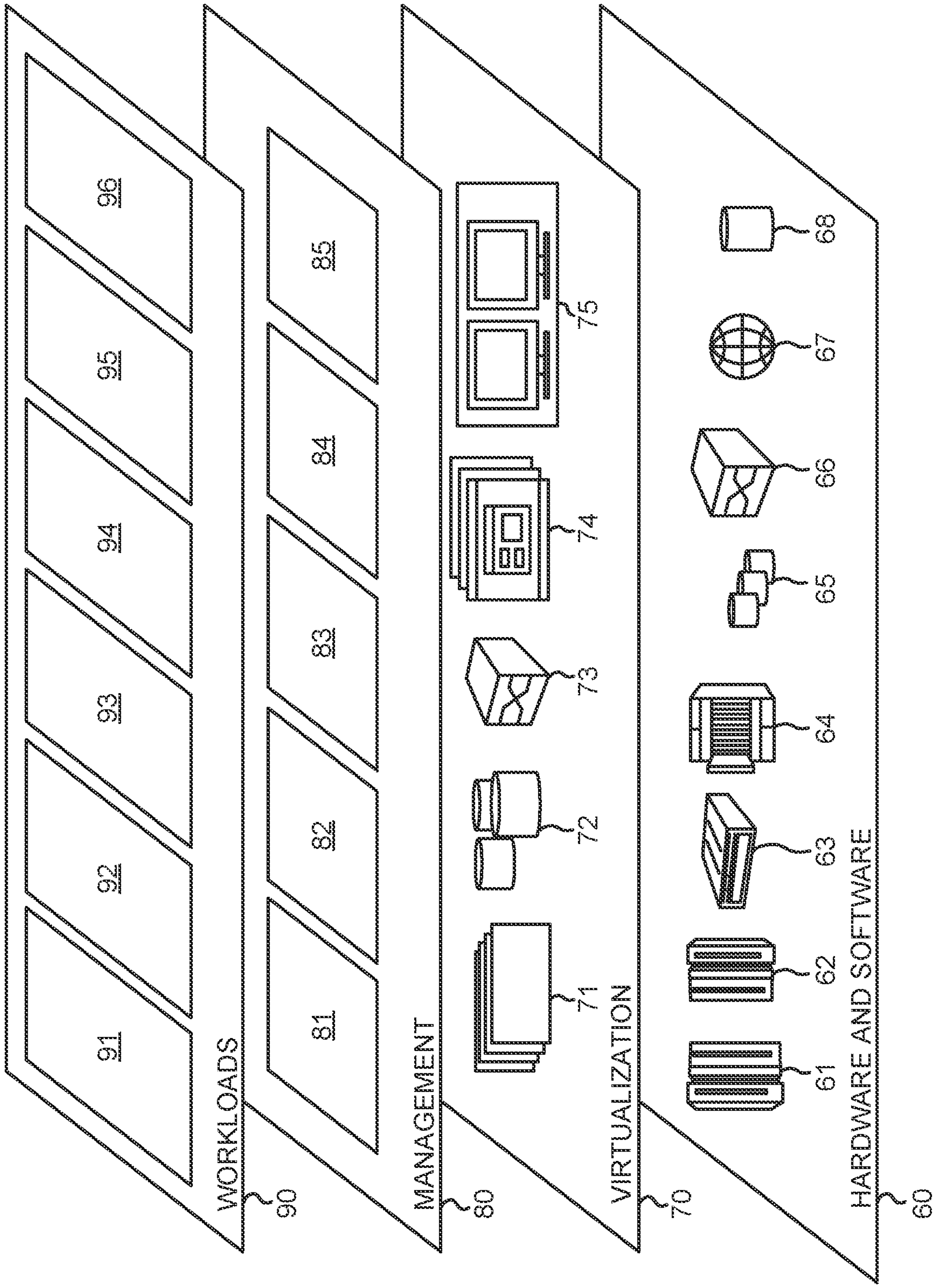
FIG. 8 depicts example abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing solution implementation based on reference architectures 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 2 and/or 5 and/or implement the functionality discussed in FIGS. 1, 3, and/or 4 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method, comprising:

receiving, by at least one processor, specifications for a computing resource flow to implement a computing solution in a cloud computing environment, wherein the computing resource flow comprises a set of computing resources and computing resource relationships that implement the computing solution;

identifying, by the at least one processor and a match score, a reference architecture that corresponds to at least a part of the computing resource flow for the computing solution, the reference architecture comprising a cloud computing infrastructure configured to provide one or more services, wherein the match score is based on a number of computing resource relationships contained in the reference architecture that corresponds to the computing resource relationships contained in the computing resource flow;

obtaining, by the at least one processor, a reference template for the reference architecture from a reference code repository, the reference template defining an existing computing resource flow to provide the one or more services via the cloud computing infrastructure;

generating, by the at least one processor, a solution template for the computing solution that is based in part on the reference template, wherein the reference template is programmatically modified to correspond to the specifications of the computing resource flow to generate the solution template that provisions the computing resource flow in the cloud computing environment; and automatically retrieving, by the at least one processor, the solution template from a computer memory and executing the solution template to implement the computing solution, wherein executing the solution template provisions individual computing resources of the set of computing resources in the cloud computing environment and configures the individual computing resources to establish the computing resource relationships defined by the computing resource flow that implement the one or more services in the cloud computing environment.

2. The computer-implemented method of claim 1, wherein receiving the specifications for the computing resource flow further comprises:

receiving a diagram as code that defines the computing resource flow for the computing solution; and analyzing the diagram as code to extract information for the computing resources and the computing resource relationships that comprise the computing resource flow.

3. The computer-implemented method of claim 1, wherein receiving the specifications for the computing resource flow further comprises:

receiving an architecture diagram that defines the computing resource flow for the computing solution; and analyzing the architecture diagram to extract information for the computing resources and the computing resource relationships that comprise the computing resource flow.

4. The computer-implemented method of claim 1, wherein identifying the reference architecture further comprises:

comparing the computing resource flow of the computing solution with a reference resource flow of the reference architecture to determine whether the reference resource flow corresponds to the computing resource flow for the computing solution.

5. The computer-implemented method of claim 1, wherein identifying the reference architecture further comprises:

categorizing the computing resource relationships identified in the reference architecture into one or more flow levels; and calculating the match score for the reference architecture based on a number of the computing resource relationships in the reference architecture that corresponds to the one or more flow levels.

6. The computer-implemented method of claim 1, wherein identifying the reference architecture further comprises:

determining that a first reference architecture corresponds to a first portion of the computing resource flow for the computing solution; and identifying a second reference architecture that corresponds to a second portion of the computing resource flow for the computing solution, wherein reference templates for the first reference architecture and the second reference architecture are used in part to generate the solution template for the computing solution.

7. The computer-implemented method of claim 1, wherein obtaining the reference template for the reference architecture further comprises:

generating a resource list of reference computing resources included in the reference architecture; and providing the resource list for display in a user interface to allow user-selection and user-deselection of the reference computing resources included in the resource list, wherein the solution template is generated to provision the reference computing resources selected from the resource list.

8. A system, comprising:

one or more computer readable storage media storing program instructions and one or more processors which, in response to executing the program instructions, are configured to:

receive specifications for a computing resource flow to implement a computing solution in a cloud computing environment, wherein the computing resource flow comprises a set of computing resources and computing resource relationships that implement the computing solution;

identify a reference architecture that corresponds to at least a part of the computing resource flow for the computing solution using a match score, the reference architecture comprising a cloud computing infrastructure configured to provide one or more services, wherein the match score is based on a number of computing resource relationships contained in the reference architecture that corresponds to the computing resource relationships contained in the computing resource flow;

obtain a reference template for the reference architecture from a reference code repository, the reference template defining an existing computing resource flow to provide the one or more services via the cloud computing infrastructure;

generate a solution template for the computing solution that is based in part on the reference template, wherein the reference template is programmatically modified to correspond to the specifications of the computing resource flow to generate the solution template that provisions the computing resource flow in the cloud computing environment to implement the computing solution; and retrieve, automatically by the one or more processors, the solution template from a computer memory and executing the solution template to implement the computing solution, wherein executing the solution template provisions individual computing resources of the set of computing resources in the cloud computing environment and configures the individual computing resources to establish the computing resource relationships defined by the computing resource flow that implement the one or more services in the cloud computing environment.

9. The system of claim 8, wherein the program instructions configured to cause the one or more processors to receive the specifications for the computing resource flow further cause the one or more processors to:

receive a diagram as code that defines the computing resource flow for the computing solution; and analyze the diagram as code to extract information for the computing resources and the computing resource relationships that comprise the computing resource flow.

10. The system of claim 9, wherein the program instructions configured to cause the one or more processors to receive the specifications for the computing resource flow further cause the one or more processors to:

receive an architecture diagram that defines the computing resource flow for the computing solution; and analyze the architecture diagram to extract information for the computing resources and the computing resource relationships that comprise the computing resource flow.

11. The system of claim 8, wherein the program instructions configured to cause the one or more processors to identify the reference architecture further cause the one or more processors to:

categorizing the computing resource relationships identified in the reference architecture into one or more flow levels; and calculate the match score for the reference architecture based on a number of the computing resource relationships in the reference architecture that corresponds to the one or more flow levels.

12. The system of claim 8, wherein the program instructions configured to cause the one or more processors to identify the reference architecture further cause the one or more processors to:

determine that a first reference architecture corresponds to a first portion of the computing resource flow for the computing solution; and identify a second reference architecture that corresponds to a second portion of the computing resource flow for the computing solution, wherein reference templates for the first reference architecture and the second reference architecture are used in part to generate the solution template for the computing solution.

13. The system of claim 8, wherein the program instructions configured to cause the one or more processors to obtain the reference template for the reference architecture further cause the one or more processors to:

generate a resource list of reference computing resources included in the reference architecture; and provide the resource list for display in a user interface to allow user-selection and user-deselection of the reference computing resources included in the resource list, wherein the solution template is generated to provision the reference computing resources selected from the resource list.

14. A computer program product, comprising:

one or more non-transitory computer readable storage media, and program instructions collectively stored on the one or more non-transitory computer readable storage media, the program instructions configured to cause one or more processors to:

receive specifications for a computing resource flow to implement a computing solution in a cloud computing environment, wherein the computing resource flow comprises a set of computing resources and computing resource relationships that implement the computing solution;

identify a reference architecture that corresponds to at least a part of the computing resource flow for the computing solution using a match score, the reference architecture comprising a cloud computing infrastructure configured to provide one or more services, wherein the match score is based on a number of computing resource relationships contained in the reference architecture that corresponds to the computing resource relationships contained in the computing resource flow;

obtain a reference template for the reference architecture from a reference code repository, the reference template defining an existing computing resource flow to provide the one or more services via the cloud computing infrastructure;

generate a solution template for the computing solution that is based in part on the reference template, wherein the reference template is programmatically modified to correspond to the specifications of the computing resource flow to generate the solution template that provisions the computing resource flow in the cloud computing environment to implement the computing solution; and retrieve, automatically by the one or more processors, the solution template from a computer memory and executing the solution template to implement the computing solution, wherein executing the solution template provisions individual computing resources of the set of computing resources in the cloud computing environment and configures the individual computing resources to establish the computing resource relationships defined by the computing resource flow that implement the one or more services in the cloud computing environment.

15. The computer program product of claim 14, wherein the program instructions configured to cause the one or more processors to receive the specifications for the computing resource flow further cause the one or more processors to:

receive a diagram as code that defines the computing resource flow for the computing solution; and analyze the diagram as code to extract information for the computing resources and the computing resource relationships that comprise the computing resource flow.

16. The computer program product of claim 14, wherein the program instructions configured to cause the one or more processors to receive the specifications for the computing resource flow further cause the one or more processors to:

receive an architecture diagram that defines the computing resource flow for the computing solution; and analyze the architecture diagram to extract information for the computing resources and the computing resource relationships that comprise the computing resource flow.

17. The computer program product of claim 14, wherein the program instructions configured to cause the one or more processors to identify the reference architecture further cause the one or more processors to:

categorizing the computing resource relationships identified in the reference architecture into one or more flow levels; and calculate the match score for the reference architecture based on a number of the computing resource relationships in the reference architecture that corresponds to the one or more flow levels.

18. The computer program product of claim 14, wherein the program instructions configured to cause the one or more processors to identify the reference architecture further cause the one or more processors to:

determine that a first reference architecture corresponds to a first portion of the computing resource flow for the computing solution; and identify a second reference architecture that corresponds to a second portion of the computing resource flow for the computing solution, wherein reference templates for the first reference architecture and the second reference architecture are used in part to generate the solution template for the computing solution.

19. The computer program product of claim 14, wherein the program instructions configured to cause the one or more processors to obtain the reference template for the reference architecture further cause the one or more processors to:

generate a resource list of reference computing resources included in the reference architecture; and provide the resource list for display in a user interface to allow user-selection and user-deselection of the reference computing resources included in the resource list, wherein the solution template is generated based in part on the reference computing resources selected from the resource list.

* * * * *